OR 3,995,942 SEARCH ROOM

United Sta... [11] 3,995,942
Kawakami et al. SUBSTITUTE FOR MISSING OR [45] Dec. 7, 1976

[54] METHOD OF DRIVING A MATRIX TYPE LIQUID CRYSTAL DISPLAY DEVICE

[75] Inventors: Hideaki Kawakami; Yutaka Yoneda, both of Hitachi, Japan

[73] Assignee: Hitachi, Ltd., Japan

[22] Filed: Feb. 21, 1975

[21] Appl. No.: 551,665

[30] Foreign Application Priority Data

Mar. 1, 1974 Japan ............................. 49-23355

[52] U.S. Cl. .......................... 350/160 LC; 340/336
[51] Int. Cl.[2] ........................ G02F 1/28; G08B 5/36
[58] Field of Search .............. 350/160 LC; 340/336

[56] References Cited

UNITED STATES PATENTS 3,835,463 7/1972 Tsukamoto et al. .... 350/160 LC X

OTHER PUBLICATIONS

Sasaki; A., Takagi; T., "Display–Device Research and Developement in Japan" IEEE Trans on Electron Devices vol. ED–20 No. 11, Nov. 1973, pp. 925–33.
Lechner; B. J. et al. "Liquid Crystal Matrix Displays" Proc. of the IEEE vol. 59 No. 11 Nov. 1971, pp. 1566–79.

*Primary Examiner*—John K. Corbin
*Assistant Examiner*—Rolf Hille
*Attorney, Agent, or Firm*—Craig & Antonelli

[57] ABSTRACT

A method of line-by-line scanning liquid crystal dots at the intersections of signal and scanning lines arranged in a matrix form, a signal including a selective voltage enough to excite the liquid crystal dot into illumination and a bias voltage for averaging a cross talk voltage is applied to the signal line. The duration time or pulse width of the selective voltage may be varied in accordance with a desired tone level, so that a display with tone can be achieved while the cross talk voltage is averaged.

1 Claim, 9 Drawing Figures

METHOD OF DRIVING A MATRIX TYPE LIQUID CRYSTAL DISPLAY DEVICE

The present invention relates to a method of driving a matrix type liquid crystal display device and more particularly such a method in which a display with tone is possible.

A typical liquid crystal display device comprises two glass plates which are spaced apart from each other with a gap of several tens of microns by a spacer. The gap is filled with a liquid crystal. Electrodes of a desired display pattern are provided on the inner surfaces of the upper and lower glass plates. The electrodes on the upper glass plate comprise transparent conductive films and the electrodes on the lower glass plate comprise transparent conductive or metal films depending upon the display type of the display device used.

The filled liquid crystal may be a nematic liquid crystal. As operation modes of the display device, there is a dynamic scattering mode (DSM) or field effect mode (FEM). In the dynamic scattering mode, a liquid crystal is transparent when applied with no electric field and becomes opaque in white and visible when applied with a certain electric field higher than a thresthold intensity. The liquid crystal of the latter state is said to be excited into illumination. In the field effect mode, the birefringence or rotary polarization of light occurs depending upon the orientation of the liquid crystal molecules and the orientation may be controlled by the intensity of the applied electric field, which is applicable to a color-selective or black and white display.

In the above-described arrangement of the liquid crystal display device, the upper electrodes (X-line electrodes) and lower electrodes (Y-line electrodes) are usually arranged in a matrix form. A desired image such as numerals, characters or pictures can be reproduced by selecting X- and Y-line electrodes to be applied with a voltage and applying an electric field across a liquid crystal dot at the intersection of the selected X- and Y-line electrodes. However, when such a matrix type liquid crystal display device is scanned line-by-line, a so-called "cross talk voltage" may be applied to liquid crystal dots in which no display is desired, since the liquid crystal has a bidirectional property. If the cross talk voltage exceeds a threshold value at which the liquid crystal is excited into illumination, there arises a problem in that liquid crystal dots with such a cross talk voltage are undesirably excited into illumination.

For ease in terminology in this specification, a state in which X- and Y-lines are simultaneously selected for display is referred to as "selected state" of liquid crystal dot. A state in which either X- or Y-line is selected is referred to as "half-selected state" and a state in which both X- and Y-lines are not selected is referred to as "non-selected state". The cross talk voltage is one which is applied to a liquid crystal dot in its half-selected or non-selected state.

A cross talk voltage averaging method for preventing a problem where undesirable dots are excited into illumination by the cross talk voltage, is described in U.S. application Ser. No. 441,356 filed on Feb. 11, 1974, now U.S. Pat. No. 3,877,017 assigned to the present assignee and entitled "METHOD OF DRIVING LIQUID CRYSTAL DISPLAY DEVICE FOR NUMERIC DISPLAY". In this method, the highest voltage $V_0$ applied to X- and Y-lines is divided into three voltage levels $V_0$, $V_1$ and $V_2$ ($V_0>V_1>V_2>0$) and the divided voltages are suitably combined to apply to a liquid crystal dot a voltage of $\pm V_0$ in its selected state and a voltage of about $\pm\frac{1}{3}V_0$ in its half-selected and non-selected states. Thus, the voltage (cross talk voltage) applied in the half-selected and non-selected states is averaged to ⅓ of the voltage applied in the selected state, thereby eliminating an inconvenience due to the cross talk voltage.

However, a display with tone cannot be achieved in this conventional cross talk voltage averaging method. For a display with tone, the effective value of a voltage applied to a liquid crystal dot must be varied. In the conventional method, when a pulse peak value or pulse width (duration time) of a voltage applied in the selected state is varied, the cross talk voltage in the half-selected or non-selected state cannot be averaged.

Accordingly, an object of the present invention is to provide a method of driving a matrix type liquid crystal display device, in which a display with tone is possible while a cross talk voltage is averaged.

According to the present invention, there is provided a method of line-by-line scanning liquid crystal dots at the intersections of signal and scanning lines arranged in a matrix form, therein a signal comprising a first voltage for exciting the liquid crystal dot into illumination and a second voltage for averaging a cross talk voltage across the liquid crystal dot in its non-selected state is applied to the signal line, the duration time of the first voltage being varied in accordance with a desired tone level.

Other objects and features of the present invention will be apparent when reading the following detailed description in conjunction with the accompanying drawings, in which.

Figure 1:
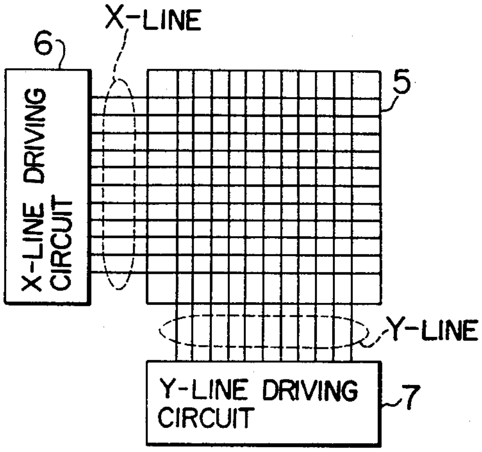
FIG. 1 is a schematic diagram of a typical matrix type liquid crystal display device.
Figure 2:
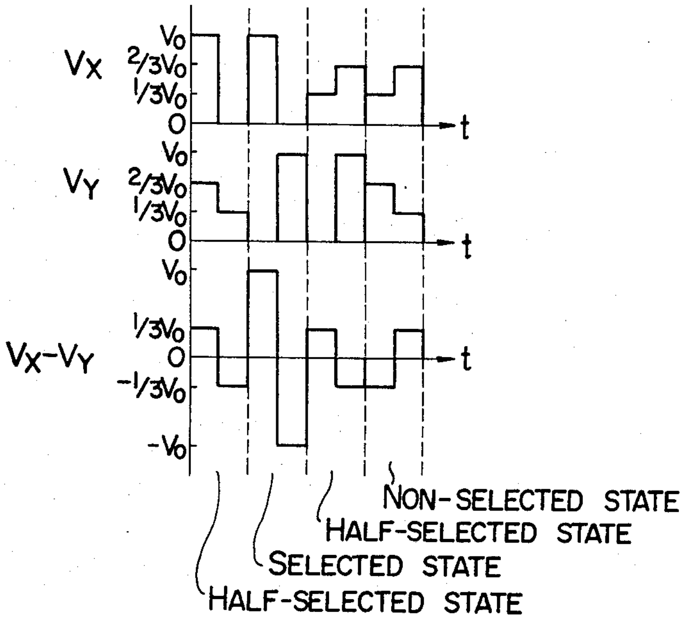
FIG. 2 PRIOR ART
FIG. 2 shows an example of voltage waveforms used in a conventional driving method.

First, a conventional driving method for a matrix type liquid crystal display device is explained referring to FIGS. 1 and 2.

In FIG. 1 showing a basic arrangement of a typical matrix type liquid crystal display device, reference numeral 5 is a liquid crystal display panel, numeral 6 a X-line driving circuit and numeral 7 a Y-line driving circuit. Portions of a liquid crystal existing at the intersections of X-lines from the X-line driving circuit 6 and Y-lines from the Y-line driving circuit 7 provide liquid crystal display dots. Waveforms used in a conventional method of driving such a matrix type liquid crystal display device are shown in FIG. 2. In the figure, $V_X$ is a voltage applied to the X-lines, $V_Y$ a voltage applied to the Y-lines and $V_X - V_Y$ a voltage applied to the liquid crystal dots, i.e. the intersections of the X- and Y-lines.

From FIG. 2, it is apparent that a voltage (cross talk voltage) applied to a dot in its half-selected and non-selected states is averaged to ⅓ of a voltage applied to a dot in its selected state, thereby eliminating an inconvenience duce to the cross talk voltage.

With the waveforms of FIG. 2, when a pulse peak value or duration time (pulse width) of a voltage applied in the selected state is varied, the cross talk voltage cannot be averaged. Therefore, a display with tone may not be achieved by changing the effective value of the voltage applied to a dot.

In accordance with a driving method of the present invention, a display with tone can be achieved while a cross talk voltage is averaged.

Figure 3:
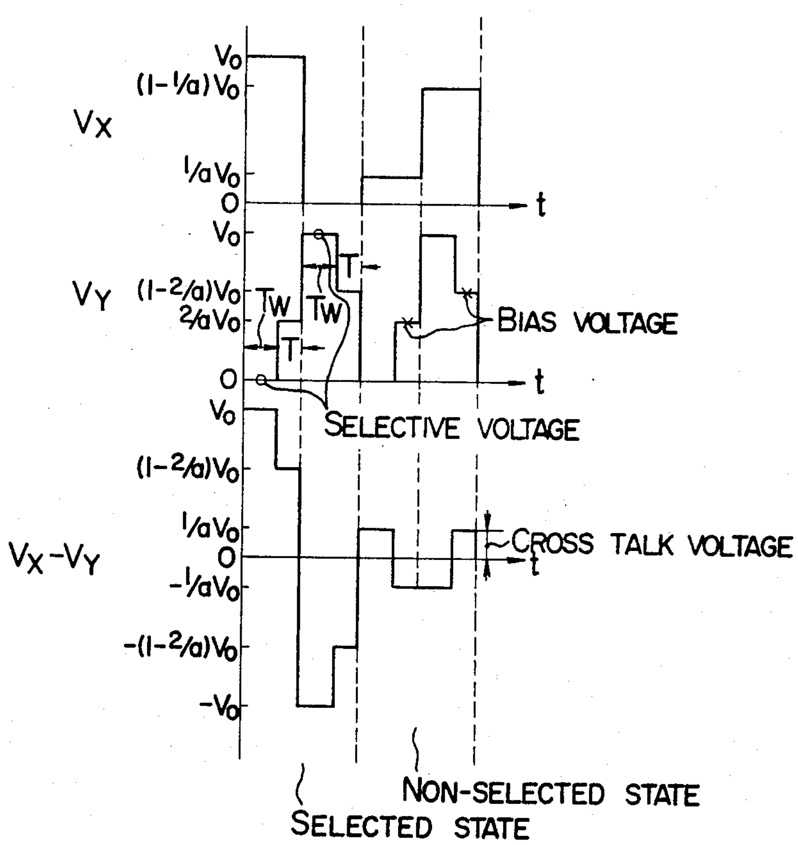
FIG. 3 shows an example of voltage waveforms used in a driving method according to the present invention.

FIG. 3 shows waveforms used in the driving method of the present invention. A display with tone is possible while a cross talk voltage is averaged to $1/aV_0$. Here, $a$ meets a condition of $a > 3$ and $V_0$ is the highest driving voltage selected not to excite the liquid crystal dot into illumination, i.e. a voltage exceeding a threshold value to excite the dot into illumination.

A voltage $V_X$ applied to X-lines (hereinafter referred to as "scanning lines") comprises voltages of $V_0$ and zero applied to a dot in its selected state and voltages of $1/aV_0$ and $(1 - 1/a)V$ applied in its nonselected state.

A signal $V_Y$ pulse width-modulated as described hereinafter is applied to Y-lines (hereinafter referred to as "signal lines") which intersect with the scannning lines. The signal $V_Y$ has time intervals $T_w$ (duration time) during when a first or selective voltage for exciting the dot into illumination is applied and time intervals T during when a second or bias voltage for averaging a cross talk voltage is applied. Voltages of zero and $V_0$ are applied in the intervals $T_w$ and voltages of $2aV_0$ and $(1 - 2/a)V_0$ are applied in the intervals T.

As seen from the voltage $(V_X - V_Y)$ applied to the dot, a voltage or cross talk voltage in the non-selected state is $\pm 1aV_0$ and a voltage in the selected state is $\pm V_0$ in the interval $T_w$ and $\pm(1 - 2/a)V_0$ in the interval T. The effective value applied to the dot can be changed by varying the interval $T_w$, i.e. the duration time (pulse width) of the selective voltage. Thus, with the waveforms of FIG. 3, a display with tone can be achieved by maintaining the effective voltage in the non-selected state and changing only the effective voltage in the selected state.

Figure 4:
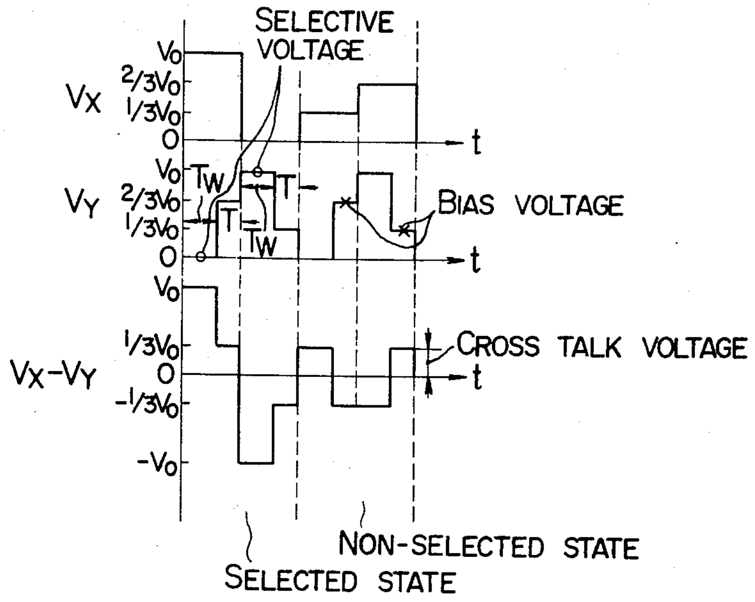
FIG. 4 shows one concrete example of the waveforms shown in FIG. 3.

Waveforms when $a = 3$ is employed in FIG. 3 are shown in FIG. 4. In FIG. 4, the bias voltage comprises $2/aV_0$ and $(1 - 2/a)V_0$ and the cross talk voltage is averaged to $\pm ⅓V_0$. The effective voltage in the selected state is controlled by varying the time interval $Tw$.

Figure 5:
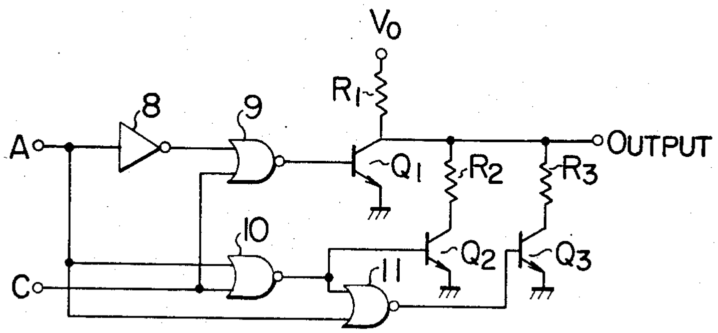
FIG. 5 is a diagram of a driving circuit for producing the waveforms shown in FIG. 4.

FIG. 5 shows a driving circuit for producing the waveforms of FIG. 4. In FIG. 5, reference characters $Q_1$, $Q_2$ and $Q_3$ are switching transistors, characters $R_1$, $R_2$ and $R_3$ resistors, numeral 8 an inverter, numerals 9, 10 and 11 NOR gates, character A an address signal terminal and character C a clock signal terminal. Table I shows ON-OFF of the switching transistors $Q_1$, $Q_2$, $Q_3$ and the output voltage relative to the address signal and clock signal. It will be apparent from Table I that any one of the desired output voltages ⅔$V_0$, ⅓$V_0$, zero and $V_0$ can be obtained by a suitable combination of the address signal and clock signal.

Table I

| Address signal | Clock signal | ON-transistor | Output voltage |
|---|---|---|---|
| 0 | 0 | $Q_2$ | $2/3V_0$ |
| 1 | 0 | $Q_3$ | 1/3Vhd O |
| 1 | 1 | None | $V_0$ |

Figure 6:
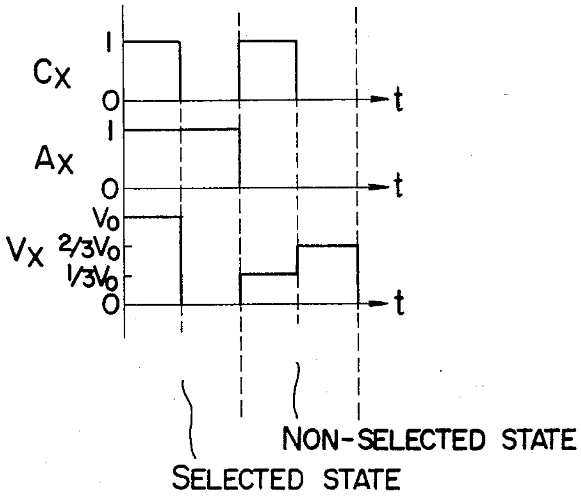
FIGS. 6 and 7 show signals at various parts of the circuit of FIG. 5.
Figure 7:
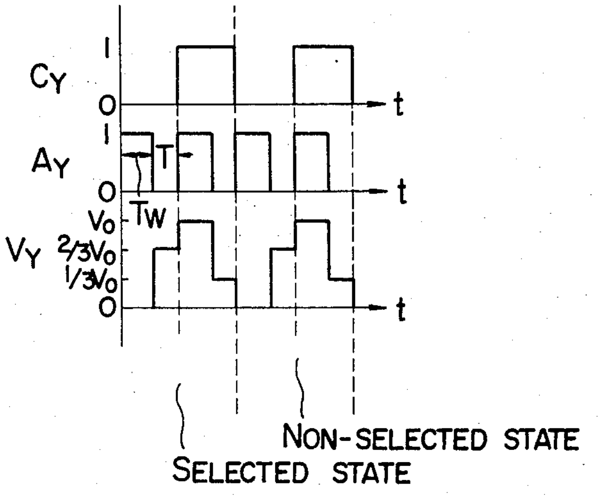

By using the driving circuit of FIG. 5 and suitably combining the address signal and clock signal, a voltage $V_X$ to be applied to scanning lines as shown in FIG. 6 and a voltage $V_Y$ to be applied to signal lines shown in FIG. 7 are obtained. FIG. 7 shows a pulse width-modulated signal. The pulse width $T_w$ of the address signal $A_Y$ is controlled in accordance with a picture image signal to be reproduced. As a result, a display with tone is obtained.

Figure 8:
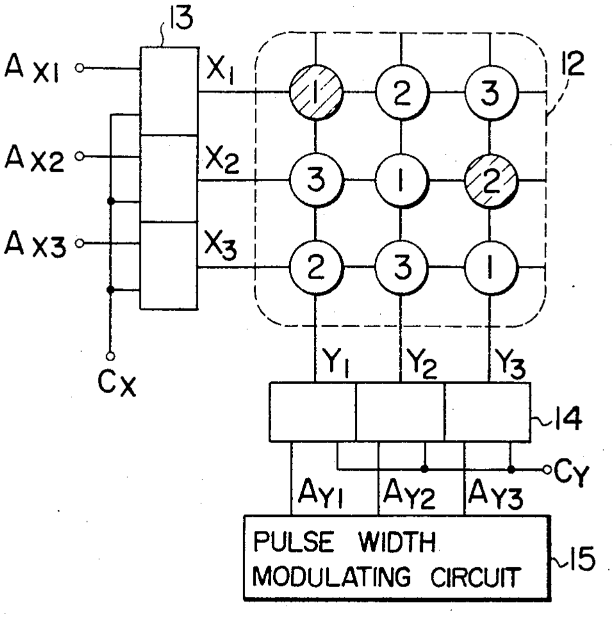
FIG. 8 shows schematically an arrangement for carrying out a driving method according to the present invention.
Figure 9:
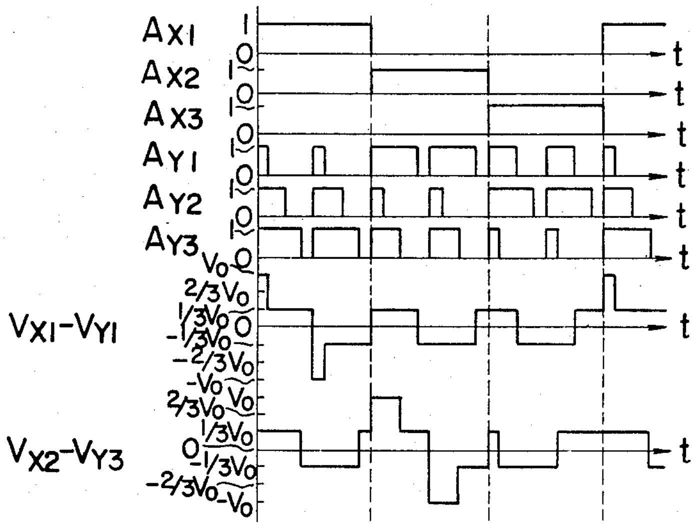
FIG. 9 shows waveforms for explaining the operation of the arrangement of FIG. 8.

An arrangement for carrying out a driving method according to the present invention is shown in FIG. 8. FIG. 9 is waveforms for explaining the operation of the arrangement of FIG. 8.

For the purpose of the convenience of illustration, a 3 × 3 matrix type liquid crystal display panel 12 is depicted. Numerals 1, 2 and 3 appearing in the liquid crystal dots represent predetermined tone levels. The driving circuit of FIG. 5 may be used as a scannning line driving circuit 13 and a signal line driving circuit 14. A line-by-line scanning is employed and lines $X_1$, $X_2$ and $X_3$ are sequentially scanned.

The operation is illustrated in FIG. 9 relative to time. Address signals $A_{Y1}$, $A_{Y2}$ and $A_{Y3}$ applied to the signal line driving circuit 14 are ones pulse width-modulated by a conventional pulse width or duration time modurating circuit 15.

Voltages applied to dots shaded in FIG. 8 are $V_{X1} - V_{Y1}$ and $V_{X2} - V_{Y3}$. The values of the voltages $V_{X1} - V_{Y1}$ and $V_{X2} - V_{Y3}$ in the non-selected state are $\pm ⅓V_0$ and equal in effective value. In the selected state, the pulse widths or duration times of $\pm V_0$ and different depending upon the tone levels. Since the tone level of $V_{X1} - V_{Y1}$ is 1 and the tone level of $V_{X2} - V_{Y3}$ is 2, the pulse width of $\pm V_0$ in $V_{X2} - V_{Y3}$ is larger than that in $V_{X1} - V_{Y1}$.

Assuming that a cross talk voltage is $1/aV_0$ and the number of scanning lines is N, the effective voltage $v_s$ at the dot is represented by equation (1), taking $m = T_w/(T + T_w)$ as a parameter.

$$v_s = \frac{1}{a} V_0 \sqrt{1 + \frac{(a-1)(4m+a-3)}{N}} \quad (1)$$

The equation (1) shows that the effective voltage $v_s$ increases with the increase of $m$. On the other hand, the brightness of liquid crystal depends upon the effective voltage. This phenomenon is observed in both dynamic scattering and field effect modes. Therefore, the arrangement of FIG. 8 can provide a display with tone by pulse width or duration time modulation.

When the waveforms of FIG. 4 and the arrangement of FIG. 8 are employed, $a = 3$ and $N = 3$ are satisfied. Then, the effective voltage $v_s'$ is represented as follows:

$$v_s' = \frac{1}{3} V_0 \sqrt{1 + \frac{8}{3} m} \quad (2)$$

Since $0 < m < 1$, a display with tone is possible by varying $m$. The variation of $m$ can be achieved by merely changing the pulse width or duration time $T_{ic}$ of the address signal $A_Y$ applied to the signal line driving circuit 14 in FIG. 8.

What is claimed is:

1. A method of line-by-line scanning liquid crystal dots at the intersections of signal and scanning lines arranged in a matrix form, wherein a signal comprising a first voltage for exciting the liquid crystal dot into illumination and a second voltage for averaging a cross talk voltage across the liquid crystal dot in its non-selected state is applied to the signal line, the duration time of the first voltage being varied in accordance with a desired tone level and wherein the first voltage includes voltage portions of zero and $V_0$, the second voltage includes voltage portions of $(1 - 1/a)\,V_0$ and $(1 - 2/a)V_0$, voltages of $V_0$ and zero and voltages of $1/a\ V_0$ and $(1 - 1/a)V_0$ are applied to the scanning line in the selected state of the liquid crystal dot and in the non-selected state thereof respectively, $V_0$ being a voltage exceeding a threshold value to excite the liquid crystal dot into illumination, $a$ meeting a condition of $a > 3$, and the voltages of zero and $2/aV_0$, the voltages of $V_0$ and $(1 - 2/a)V_0$, the voltages of zero and $2/aV_0$ and the voltages of $V_0$ and $(1 - 2/a)V_0$ being applied to the signal line at the application of the voltage of $V_0$, the voltage of zero, the voltage of $1/aV_0$ and the voltage of $(1 - 2/a)V_0$ to the scanning line respectively.

* * * * *